(12) United States Patent
Klein et al.

(10) Patent No.: US 8,817,311 B2
(45) Date of Patent: *Aug. 26, 2014

(54) INTEGRATED TASK MANAGEMENT SYSTEMS AND METHODS FOR EXECUTING RULE-BASED OPERATIONS

(71) Applicant: United Parcel Service of America, Inc., Atlanta, GA (US)

(72) Inventors: Kenneth S. Klein, Ligonier, PA (US); Herbert G. Waite, Dawsonville, GA (US); George D. Starr, Atlanta, GA (US); Nathan Warmbrod, Fort Worth, TX (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,516

(22) Filed: Aug. 20, 2013

(65) Prior Publication Data

US 2013/0335777 A1 Dec. 19, 2013

Related U.S. Application Data

(63) Continuation of application No. 11/097,578, filed on Apr. 1, 2005, now Pat. No. 8,537,384.

(60) Provisional application No. 60/558,930, filed on Apr. 1, 2004.

(51) Int. Cl.
*G06F 17/00* (2006.01)

(52) U.S. Cl.
USPC ............ 358/1.15; 358/1.13; 705/22; 709/201; 709/232

(58) Field of Classification Search
CPC .............. G06K 15/18; G06K 15/1822; G06K 15/1823; G06K 15/1836; G06K 15/1859; G06K 2215/0042

USPC ............ 358/1.13, 1.15; 705/22; 709/201, 232
See application file for complete search history.

(56) References Cited

U.S. PATENT DOCUMENTS

| 5,485,369 A | 1/1996 | Nicholls et al. |
| 5,631,827 A | 5/1997 | Nicholls et al. |

(Continued)

FOREIGN PATENT DOCUMENTS

| EP | 0 236 744 B1 | 9/1987 |
| JP | 62-214437 | 9/1987 |

(Continued)

OTHER PUBLICATIONS

Ohno, Yoshio; "Introduction to TeX," Jun. 1989, thirteen pages (four pages translated).

(Continued)

*Primary Examiner* — Peter K Huntsinger
(74) *Attorney, Agent, or Firm* — Alston & Bird LLP

(57) ABSTRACT

A system for integrating multiple software modules configured to produce output according to established business rules is provided. The system in one embodiment coordinates the printing of a variety of labels and reports according to a set of complex business rules. Complex output tasks may be distributed to remote computers in a network for optimum efficiency. The system may be configured to comply with one or more standard database connectivity standards in order to provide a generic interface with foreign systems. The method in one embodiment includes acquiring an input, sending a query to a database, retrieving business rules and associated tasks, and building scripts or commands for each task.

This Abstract is provided to comply with the rules, which require an abstract to quickly inform a searcher or other reader about the subject matter of the application. This Abstract is submitted with the understanding that it will not be used to interpret or limit the scope or meaning of the claims.

14 Claims, 5 Drawing Sheets

(56) References Cited

U.S. PATENT DOCUMENTS

| | | | |
|---|---|---|---|
| 6,016,499 | A | 1/2000 | Ferguson |
| 6,999,070 | B2 | 2/2006 | Jeyachandran et al. |
| 7,265,866 | B2 | 9/2007 | Holmstead et al. |
| 7,474,426 | B2 | 1/2009 | Benz et al. |
| 8,537,384 | B2 * | 9/2013 | Klein et al. .......... 358/1.15 |
| 2002/0124196 | A1 | 9/2002 | Morrow et al. |
| 2003/0007178 | A1 | 1/2003 | Jeyachandran et al. |
| 2004/0078258 | A1 | 4/2004 | Schulz et al. |
| 2004/0083448 | A1 | 4/2004 | Schulz et al. |
| 2004/0187089 | A1 | 9/2004 | Schulz et al. |

FOREIGN PATENT DOCUMENTS

| | | |
|---|---|---|
| JP | 62-229364 A | 10/1987 |
| JP | 07-110814 A | 4/1995 |
| JP | 08-142438 | 6/1996 |
| JP | 10-035038 | 2/1998 |
| JP | 10-222510 | 8/1998 |
| WO | WO 03/052578 A2 | 6/2003 |

OTHER PUBLICATIONS

Product Announcement; "Seagull Scientific: BarTender Label Printing Software," Automatic I.D. News, vol. 15, No. 10 (Sep. 1, 1999); two pages.

Anderson, Dana; Barcode Printing from the Enterprise (Sep. 14, 1999), pp. 1-2, Loftware Inc., Cape Neddick, Maine USA.

Anderson, Dana; Performance Considerations (Oct. 1, 1999), pp. 1-2, Loftware Inc., Cape Neddick, Maine USA.

Anderson, Dana; Loftware's Open Architecture Equals Flexibility: A Technical White Paper (Oct. 6, 1999), pp. 1-4, Loftware Inc., Cape Neddick, Maine USA.

Office Action dated Nov. 26, 2008, Canadian Patent Application No. 2,503,427, filed Oct. 1, 2005.

Feibus, Andy, Crystal Reports Upgrade is Useful, Not Dramatic —Incremental Changes Include Additional Features for Database Handling; Feb. 15, 1999, Copyright 1999 CMP Media, Inc. Information Week, pp. 1-4.

Cover Story, The Best of 1999, Copyright 2000, PC Magazine, Jan. 4, 2000, pp. 101, 116 and 118.

Abstract, "Bar Tender for DOS 6.2", Seagull Scientific Systems, Inc.

Abstract, "Bar Tender for Windows 2.2", Seagull Scientific Systems, Inc.

Feibus, A., Reporting on Crystal (database handling) Abstract only, *Information Week* (UK), No. 57, Mar. 3, 1999, p. 35-36.

Abstract, Software Seagate Crystal Reports Version 7. (desktop report generating software), *PC Magazine,* Jan. 4, 2001, p. 101.

Office Action dated Jan. 31, 2011, Canadian Applicatino No. 2,503,427.

Office Action dated Mar. 9, 2010, Canadian Application No. 2,503,427.

Canadian Intellectual Property Office, Requisition by the Examiner for Application No. 2,503,427, Nov. 7, 2012, 2 pages, Canada.

Machine translation of description of WO 2003/052578.

\* cited by examiner

US 8,817,311 B2

INTEGRATED TASK MANAGEMENT SYSTEMS AND METHODS FOR EXECUTING RULE-BASED OPERATIONS

CROSS-REFERENCE TO RELATED APPLICATIONS

This patent application is a continuation of U.S. patent application Ser. No. 11/097,578 filed Apr. 1, 2005, which claims priority to and the benefit of U.S. Provisional Patent Application No. 60/558,930, filed Apr. 1, 2004, both of which are incorporated by referenced herein in their entirety.

BACKGROUND

1. Technical Field

The following disclosure relates generally to the field of software systems for integrating multiple modules and more particularly, to an integrated system for coordinating labeling and printing tasks according to complex business rules.

2. Description of Related Art

Many facilities run different software modules for handling different tasks, such as shipping, receiving, inventory control, order fulfillment, and the like. For every interaction between a user and one of these software modules, a corresponding output is usually generated. The output may be in the form of, for example, a printed document, a report, or the storage of a record to a database. Running various software modules on an as-needed basis represents an inefficient use of labor, equipment, and resources.

Many software modules currently in use required the user to make decisions based upon a certain input, such as the scanning of a bar code or the entry of a parcel tracking number. User decisions create a need for training and introduce the risk of human error into the system, often when the decision to be made is rote and always the same in response to a particular kind of input.

In addition to the risk of user decisions or choices made in error, a user may also neglect to make a decision or enter a choice to produce a desired output. For example, a user in a shipping department may print a packing slip but not a shipping label, and may neglect to update the inventory indicating an item has been packed and shipped.

Thus, there is a need in the art for an improved system for integrating discrete software modules and streamlining the various processes between receiving an input and producing a desired output.

SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

Certain illustrative example apparatuses, methods, systems, processes, and the like, are described herein in connection with the following description and the accompanying drawing figures. These examples represent but a few of the various ways in which the principles supporting the apparatuses, methods, systems, processes, and the like, may be employed and thus are intended to include equivalents. Other advantaged and novel features may become apparent from the detailed description which follows, when considered in conjunction with the drawing figures.

The above and other needs are met by the present invention which provides a task management method that may include the steps of storing a set of business rules for a facility, acquiring an input related to the facility, sending a query including the input to the set of business rules, receiving a list of tasks in response to the query, building one or more commands designed to accomplish the list of tasks, and sending the one or more commands to an output device related to the facility. The step of receiving a list of tasks may also include receiving stored data related to the input. The step of sending the one or more commands to an output device may also include sending print commands to a printer. The step of sending the one or more commands to an output device may include rendering a document based upon the commands, and sending the document to a printer.

In one aspect, the task management method may be implemented in a distributed system including a local client computer and a distant server computer. The step of sending one or more commands to an output device may include the steps of sizing each of the commands in comparison to a threshold size, wherein those smaller than the threshold size are marked as small jobs and the others are marked as large jobs; then, for each of the small jobs, rendering a document based upon the small job using the distant server computer, and sending the document to a printer associated with the local client computer; and then, for each of the large jobs, sending the commands to the local client computer for rendering and printing locally.

The step of sending the one or more commands to an output device may also include stacking the commands in a queue until a scheduled execution time.

The step of acquiring an input may include providing a user interface configured to receive the input from one or more input devices operated by a user at the facility. In one embodiment, the user interface may be configured exclusively to receive the input from one or more input devices operated by a user at the facility.

The steps of sending a query and receiving a list may occur via the Internet, between a local client computer and a distant server computer.

In another aspect, the task management method may also include the steps of providing a database application interface in communication with a database module housing the set of business rules, providing an inventory application interface in communication with an inventory module, and providing a printing application interface in communication with a printing module, the printing module configured to control the output device. The database application interface may be written according to a database connectivity standard, such that data from any data source compliant with the connectivity standard may be accepted and processed.

In another aspect of the present invention, a task management module is provided, for managing and executing commands as part of the system of the present invention. The task management module may be configured to store a set of business rules for a facility, acquire an input related to the facility, send a query including the input to the set of stored business rules, receive a list of tasks in response to the query, build one or more commands designed to accomplish the list of tasks, and send the commands to an output device related to the facility. The list of tasks may include stored data related to the input. The output device may include one or more printers. The commands may be designed to render a document for printing. The task management module may be configured to stack the commands in a queue until a scheduled execution time. The task management module may include a computer software program product.

In one aspect, the task management module may be configured to communicate with a user interface that is configured to receive the input from one or more input devices operated by a user at the facility. In one embodiment, the user interface may be configured exclusively to receive the input from one or more input devices operated by a user at the facility.

In one embodiment, the task management module may be configured to transmit and receive data via the Internet, between a local client computer and a distant server computer. The module may be further configured to differentiate the one or more commands as either simple commands or complex commands, wherein the complex commands require greater processing time and capacity; and, distribute the execution of the commands between and among the local client computer and the distant server computer in order to optimize the use of computing capacity, such that the simple commands are executed using the distant server computer and the complex commands are sent to the local client computer for execution.

In another aspect, the task management module may be configured to transmit and receive data via the Internet, between a local client computer and a distant server computer. The module may be further configured to size each of the one or more commands in comparison to a threshold size, wherein those smaller than the threshold size are marked as small jobs and the others are marked as large jobs; then, for each of the small jobs, render a document based upon the small job using the distant server computer, and send the document to the one or more output devices associated with the local client computer; and then, for each of the large jobs, send the commands to the local client computer for rendering and printing locally.

The task management module may include a database application interface in communication with a database module housing the set of business rules, an inventory application interface in communication with an inventory module, and a printing application interface in communication with a printing module, the printing module configured to control the output device. The output device may include one or more printers. The database application interface may be written according to a database connectivity standard, such that data from any data source compliant with the connectivity standard may be accepted and processed.

These and other objects are accomplished by the method and apparatus disclosed and will become apparent from the following detailed description of a preferred embodiment in conjunction with the accompanying drawings in which like numerals designate like elements.

BRIEF DESCRIPTION OF THE DRAWING

The invention will be more readily understood by reference to the following description, taken with the accompanying drawing figures, in which.

DETAILED DESCRIPTION OF THE INVENTION

Figure 1:
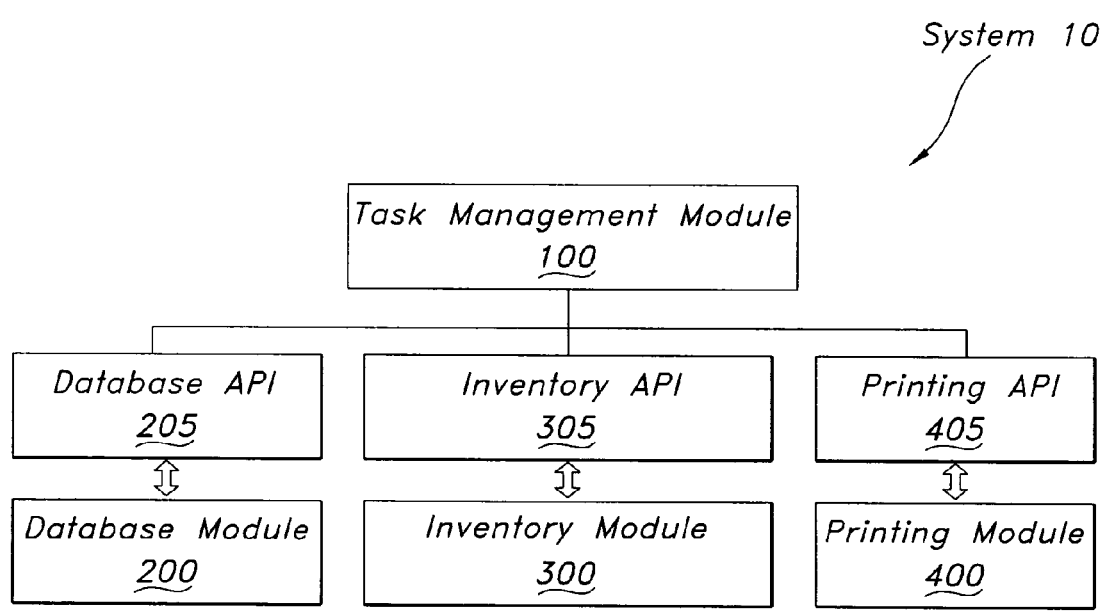
FIG. 1 is a chart illustrating the various components of a system, according to one embodiment of the present invention.

Reference is now made to the figures, in which like numerals indicate like elements throughout the several views.

Example apparatuses, methods, systems, processes, and the like, are now described with reference to the drawings, where like reference numerals are used to refer to like elements throughout. In the following description, for purposes of explanation, numerous specific details are set forth in order to facilitate a thorough understanding of the apparatuses, methods, systems, processes, and the like. It may be evident, however, that the apparatuses, methods, systems, processes, and the like, can be practiced without these specific details. In other instances, well-known structures and devices are shown in block diagram form in order to simplify the description.

As used in this application, the term "computer component" refers to a computer-related entity, either hardware, firmware, software, a combination thereof, or software in execution. For example, a computer component can be, but is not limited to being, a process running on a processor, a processor itself, an object, an executable, a thread of execution, a program, and a computer. By way of illustration, both an application running on a server and the server itself can be a computer component. One or more computer components cans reside within a process and/or thread of execution and a computer component can be localized on a single computer and/or distributed between and among two or more computers.

"Computer communications," as used herein, refers to a communication between two or more computer components and can be, for example, a network transfer, a file transfer, an applet transfer, an e-mail, a Hyper-Text Transfer Protocol (HTTP) message, XML, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic," as used herein, includes but is not limited to hardware, firmware, software and/or combinations of each to perform one or more functions or actions. For example, based upon a desired application or needs, logic may include a software controlled microprocessor, discrete logic such as an Application-Specific Integrated Circuit (ASIC), or other programmed logic device. Logic may also be fully embodied as software.

"Signal," as used herein, includes but is not limited to one or more electrical or optical signals, analog or digital, one or more computer instructions, a bit or bit stream, or the like.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

An "operable connection" (or a connection by which entities are "operably connected") is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Database," as used herein, refers to a physical and/or logical entity that can store data. A database, for example, may be one or more of the following: a data store, a relational database, a table, a file, a list, a queue, a heap, and so on. A database may reside in one logical and/or physical entity and/or may be distributed between two or more logical and/or physical entities.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

System

FIG. 1 illustrates a system, generally designated by the numeral 10, for integrating several discrete software modules, controlled by a main program or task management module 100. In one embodiment, the system 10 may include a task management module 100 in communication with a database module 200, an inventory module 300, and a printing module 400. The task management module 100 may be configured to receive input data from a variety of sources, process the input based upon a set of business rules and other criteria, and send output data by and through any of the software modules 200, 300, 400. In one embodiment, the task management module 100 may be referred to as a Strategic Labeling And Report Printing (SLAP) system.

Figure 2:
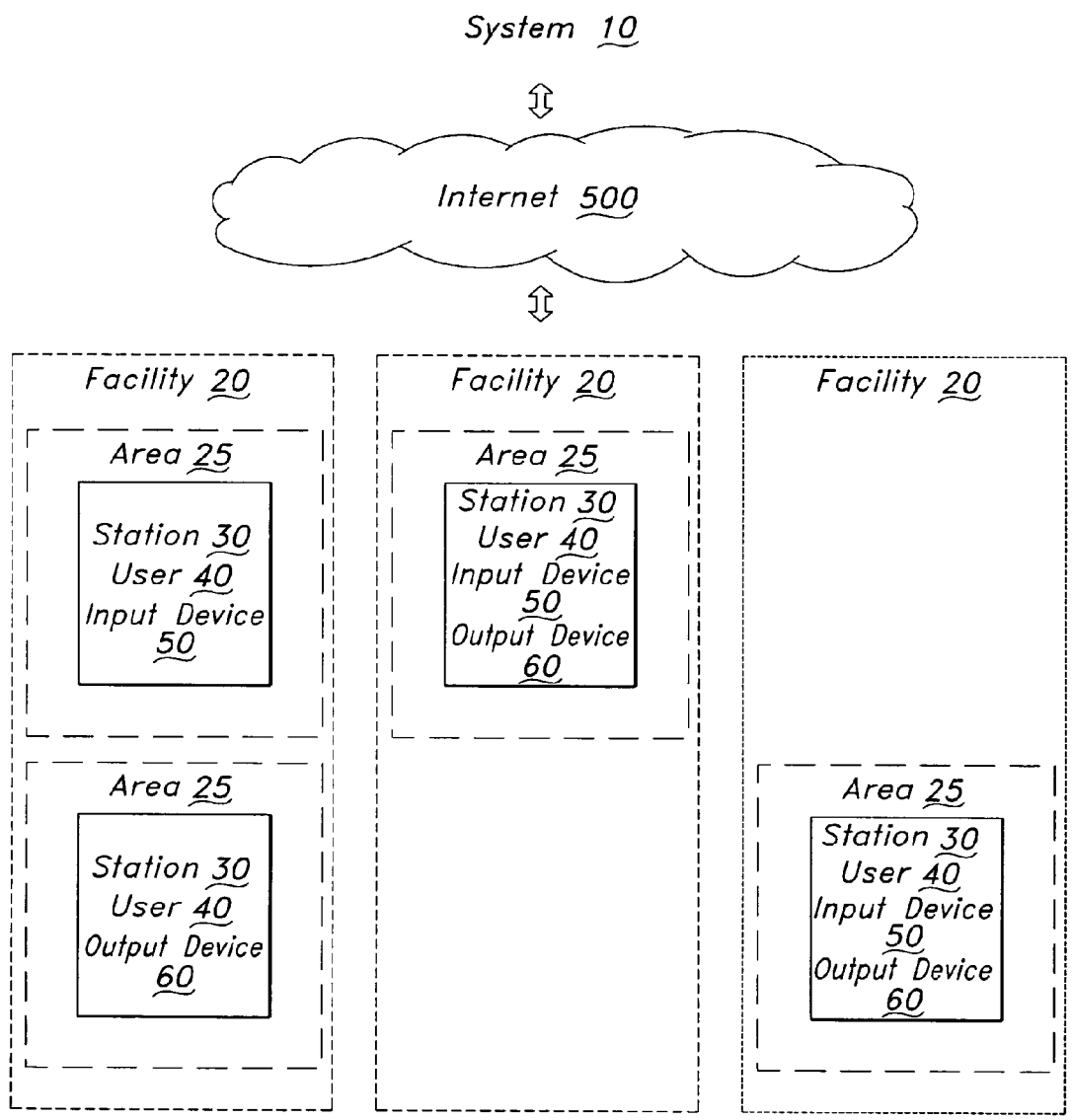
FIG. 2 is a chart illustrating a system and its relationship to one or more participating facilities, according to one embodiment of the present invention.

FIG. 2 illustrates how the system 10 of the present invention may interact, via the internet 500, with one or more participating facilities 20. As shown, a facility 20 may be subdivided into one or more areas 25. Each area 25 may or may not include a station 30, one or more persons or users 40, one or more input devices 50, and one or more output devices 60.

In one embodiment, the facility 20 may be a warehouse, distribution center, or other center where goods are handled. In the system 10, the facility 20 may have a facility identifier associated with it. Similarly, each area 25 may have an area identifier associated with it, to differentiate it from other areas 25 within the facility 20.

A station 30, in one embodiment, may refer to an office or locale where a particular activity, such as receiving or shipping, takes place on a regular basis. A station 30 may be stationary or mobile, and may include a variety of equipment. In the system 10, each station 30 may have a station identifier associated with it.

In one embodiment, a station 30 may include one or more persons or users 40 generally assigned to conduct activities there. A user 40 may or may not be assigned to a particular station 30. Each user 40 may be assigned a user identifier, so the system 10 can recognize the user 40 and distinguish her from others. In one embodiment, each user 40 may also be assigned a user status, indicating a feature of the user's role in the system 10, such as his capacity, his assigned task, or his authorization level.

Each station 30 may include one or more input devices 50, which may be stationary or portable. For example, an input device 50 may be a barcode scanner, an optical character recognition device, or an RFID reader. In one embodiment, a simple keypad or keyboard may be the input device 50 associated with a particular station 30. In the system 10, each input device 50 may include an input device identifier associated with it.

Similarly, each station 30 may include one or more output devices 60, which may be stationary or portable. An output device 60, for example, may be a general printer, a dedicated label printer, or a projector. In the system 10, each output device 60 may include an output device identifier associated with it. Each output device 60 may also include one or more types of output media, such as plain paper, blank report forms, label stock, and the like.

Entering Identifiers and Business Rules

In one embodiment of the present invention, the system 10 may include a user interface through which certain data, identifiers, and rules may be entered and stored in the system 10. In this aspect, for example, when a facility 20 is identified as a participating entity in the system 10, a collection of basic data may be entered into the system 10 in order to facilitate processing.

As illustrated in FIG. 2, each participating facility 20 may include one or more components: areas 25, stations 30, users 40, input devices 50, and output devices 60. In one embodiment, the system 10 may be configured to accept and store data concerning each facility 20 and its various components in a database. In this aspect, when an input is received from any component of a facility 20, the system 10 through the database will associate the input with that particular facility 20. Similarly, for example, the system 10 will associate the input with the station 30, user 40, and input device 50 involved in acquiring that particular input.

The system 10, in one embodiment, may be configured to accept and store a set of business rules for each participating entity or facility 20. A business rule may include one or more tasks to be performed automatically when a particular input is received. For example, for an input having the characteristics of an item number or Stock Keeping Unit number (SKU), the facility 20 may establish a business rule that includes the task of sending the retail price to a cash register. The business rule may include multiple tasks, such as sending the price, printing a receipt, and updating an inventory database. For each of a variety of inputs, a business rule may be written and stored, including a list of the tasks to be performed. In one embodiment, the system 10 of the present invention is scalable and of sufficient capacity to handle a large number and variety of business rules and tasks, from a variety of different businesses or facilities 20.

Steps in a Process

Figure 3:
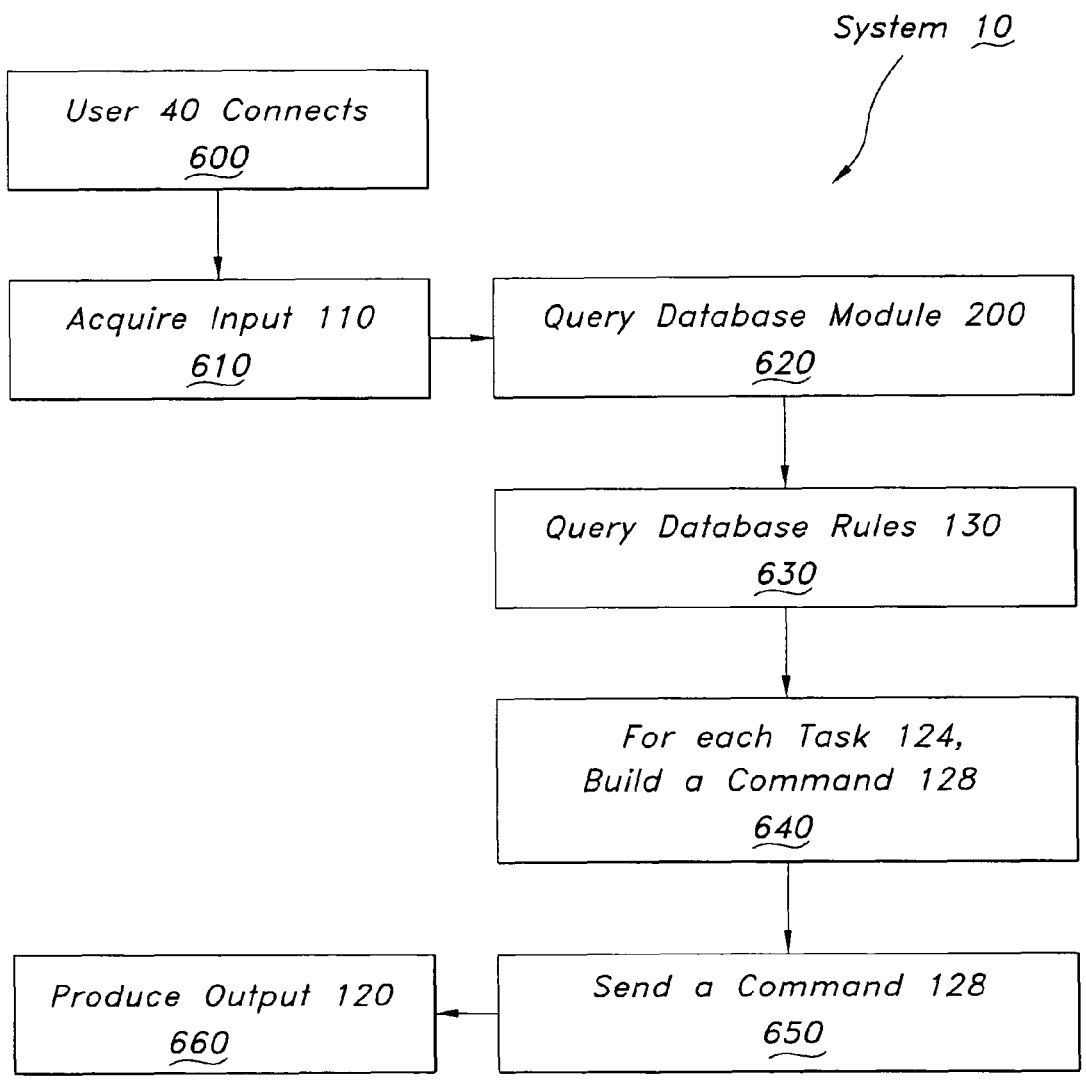
FIG. 3 is a flow chart showing a series of steps, according to one embodiment of the present invention.

FIG. 3 illustrates the flow of information through the system 10, according to one embodiment of the present invention. In Step 600, a user 40 may log-on or otherwise connect to the system 10. In one embodiment, the identity and other characteristics of the user 40 may be important in processing the input data gathered by that particular user 40. The user 40 may connect from a particular facility 20, area 25, or station 30, or the user 40 may connect from any other location via a mobile or wireless input device 50. In one embodiment, the system 10 may include a data store that relates each user 40 to a particular facility 20, area 25, or station 30. Such a data store may also include a user status, indicating some feature of the user's role in the system 10, such as his capacity, his assigned task, or his authorization level. In general, connecting 600 is one of the first steps when processing data using the system 10.

In Step 610, an input 110 is acquired. The input 110, in one embodiment, may be a number, code, or other indicia. The input 110 may be acquired from an object, such as a parcel. In one embodiment, a user 40 may employ an input device 50, such as a scanner, to acquire an input 110 or key value. Once acquired, the input 110 may be sent or otherwise communicated to the task management module 100. In one embodiment, the task management module 100 may transmit the input 110 using an internet protocol, such as an HTTP post, to a server 220 (see FIG. 5).

In one embodiment, the step 610 of acquiring input 110 may include providing a user interface configured to receive the input. The user interface may be designed for the exclusive purpose of acquiring input 110. The operator or user 40 need not know which actions to take in response to the input 110. Also, in this aspect, the system 10 may be used to limit the interaction between the operator or user 40 and the system 10, thereby allowing the established rules and procedures to take priority over any user input.

In Step 620, the task management module 100 may be configured, in one embodiment, to send a query to the database module 200, in order to search for any stored data related in any way to the input 110. For example, the input 110 may include a product identifier and the database module 200 may include stored data about certain aspects of that particular product. The query may be sent or otherwise transmitted using an internet protocol. In one embodiment, a query function may be included as part of the Database Application Programming Interface (API) 205. A query is a command or instruction used extract a desired set of data from a database. The best known query language is Structured Query Language (SQL, pronounced "sequel"), although other query languages may be used. A query may include a single command or a complex series of commands. SQL includes a wide variety of query commands. Sets of query commands that may be used again can be saved in SQL as a stored procedure Like running a program, calling a stored procedure in sequel is more efficient than sending individual query commands one at a time. Also, stored procedures are generally compiled ahead of time and may also be cached by the database management system. In this aspect, query commands may be used as a powerful programming tool. In response to the query, the database module 200 may return the stored data that is related to the input 110.

In Step 630, the task management module 100 may send a query to the one or more databases where the business rules 130 are stored in the system 10. In one embodiment, each business rule 130 may include one or more tasks 124 to be triggered in response to a particular input 110. For example, for an input 110 having the characteristics of a tracking number for shipping purposes, the associated business rule 130 for shipping may include the task 124 of printing a packing slip and the task 124 of printing a shipping label. For each of a variety of inputs 110, a business rule 130 may be written and stored, including a list of tasks 124 to be performed. Each business rule 130 may include one task 124 or it may include many tasks 125 and subtasks.

For each task 124 identified in response to the query sent in Step 630, the system 10 of the present invention may, in one embodiment, build a script of command 128 or set of commands 128 (in Step 640) designed to accomplish each task 128. For example, a task 124 to print a shipping label may include scripts or commands 128 to be sent to a particular station 30 where a particular output device 60, such as a label printer, that may be configured specifically to print shipping labels. In general, the commands 128 may include specific instructions for producing the desired output 120.

In Step 650, the system 10 of the present invention may transmit or otherwise communicate the commands 128 to the facility 20 or other location where the output 120 is desired. In one embodiment, the commands 128 may be sent using XML directly to a client computer processor. In one embodiment, the commands 128 may be held or stacked in a queue until a time scheduled for their delivery. In this aspect, for example, the system 10 may be used to control batch printing by delaying and grouping certain commands 128 intended to be sent to a particular printer. The commands 128 may also remain stacked in a queue until a certain threshold limit is reached; for example, a certain quantity or number of commands 128 or a certain type. Various threshold limits may be designed and built-in to the business rules 130 used by the system 10 in order to control and optimize the delivery of commands 128.

In response to the commands 128, the system 10 of the present invention in Step 660 may produce a desired or planned output 120. The output 120 may be something physical like a printed label, an annual report, or a bill of lading, or the output 120 may be something non-physical like the transmission and storage of data into a database. For example, in one embodiment, the system 10 of the present invention may store the input 110 and output 120, to provide a record of the system operations.

After the desired output 120 is produced in Step 660, the system 10 may receive another input 110. In one embodiment, the system 10 may be designed with sufficient capacity to accept connections from many different users 40 simultaneously and, likewise, to receive multiple inputs 110 simultaneously for processing. In this aspect, for every facility 20 where a set of business rules 130 has been developed and stored, the system 10 of the present invention may receive inputs 110 and direct the production of outputs 120 corresponding to those business rules 130.

A Task Management Module

Referring again to FIG. 1, the task management module 100 of the present invention may be configured to store a set of business rules 130 (referred to in FIG. 3) for a particular facility 20. In one embodiment, the task management module 100 may be a computer software program product. The task management module 100 may be configured to acquire an input 110 from or related to the facility 20 and, in turn, send a query including the input 110 to the set of stored business rules 130. In response to the query, the task management module 100 may be configured to receive a list of tasks 124 and then build one or more commands 128 designed to accomplish those tasks 124. The tasks 124 may include stored data related to the input 110. In one embodiment, the task management module 100 may be configured to send the commands 124 to an output device 60 related to the particular facility 20. The commands 124 may be stacked in a queue until a scheduled time.

In one embodiment, the task management module 100 of the present invention may be configured to communicate with a user interface that is designed to receive the input 110 from one or more of the input devices 50 operated by a user at a facility 20. The user interface, in one embodiment, may be designed for the exclusive function of receiving an input 110. In other words, the user interface may be designed and built to actively prevent the user from entering any commands or performing any tasks other than simply acquiring an input 110.

In one embodiment, the output device 60 may include one or more printers located at the facility 20. The commands 124, when executed, may render a document suitable for printing.

In one embodiment, the task management module 100 of the present invention may be configured to transmit and receive data via the Internet 500 between a local client computer and a distant server computer. The module 100, in one embodiment, may be configured to differentiate the commands 128 and classify them as being either simple commands or complex commands. The complex commands may require greater processing time and capacity. The module 100 may be designed to distribute the execution of the commands 128 between and among the local client computer and the distant server computer, in order to optimize the use of computing capacity, such that the simple commands are executed on distant server computer and the complex commands are sent to the local client computer for execution.

In another embodiment including a local client computer and a distant server computer, the task management module 100 of the present invention may be configured to size each command 128 in comparison to a threshold size. Those commands 128 smaller than the threshold size may be marked as small jobs and the others may be marked as large jobs. For each small job, the module 100 may be designed to render a document based upon the small job using the distant server computer, and then send the document to one of the output devices associated with the local client computer. For each large job, the module 100 may be designed to send the commands to the local client computer, where the document may be rendered and printed locally. In this aspect, the distribution of more complicated printing and rendering jobs may be handled more efficiently by the system 10 of the present invention.

In one embodiment, as shown in FIG. 1, the task management module 100 of the present invention may include a database application interface 205 in communication with a database module 200, where the set of business rules 130 may be stored. The module 100 may also include an inventory application interface 305 in communication with an inventory module 300. The module 100 may also include a printing application interface 405 in communication with a printing module 400, which may be configured to control one or more output devices 60. In one embodiment, the output devices 60 may include one or more printers.

The task management module 100, in one embodiment of the present invention, may include a database application interface 205 that has been written according to a connectivity standard, such that data from any data source compliant with the connectivity standard may be accepted and processed.

System Architecture

Figure 4:
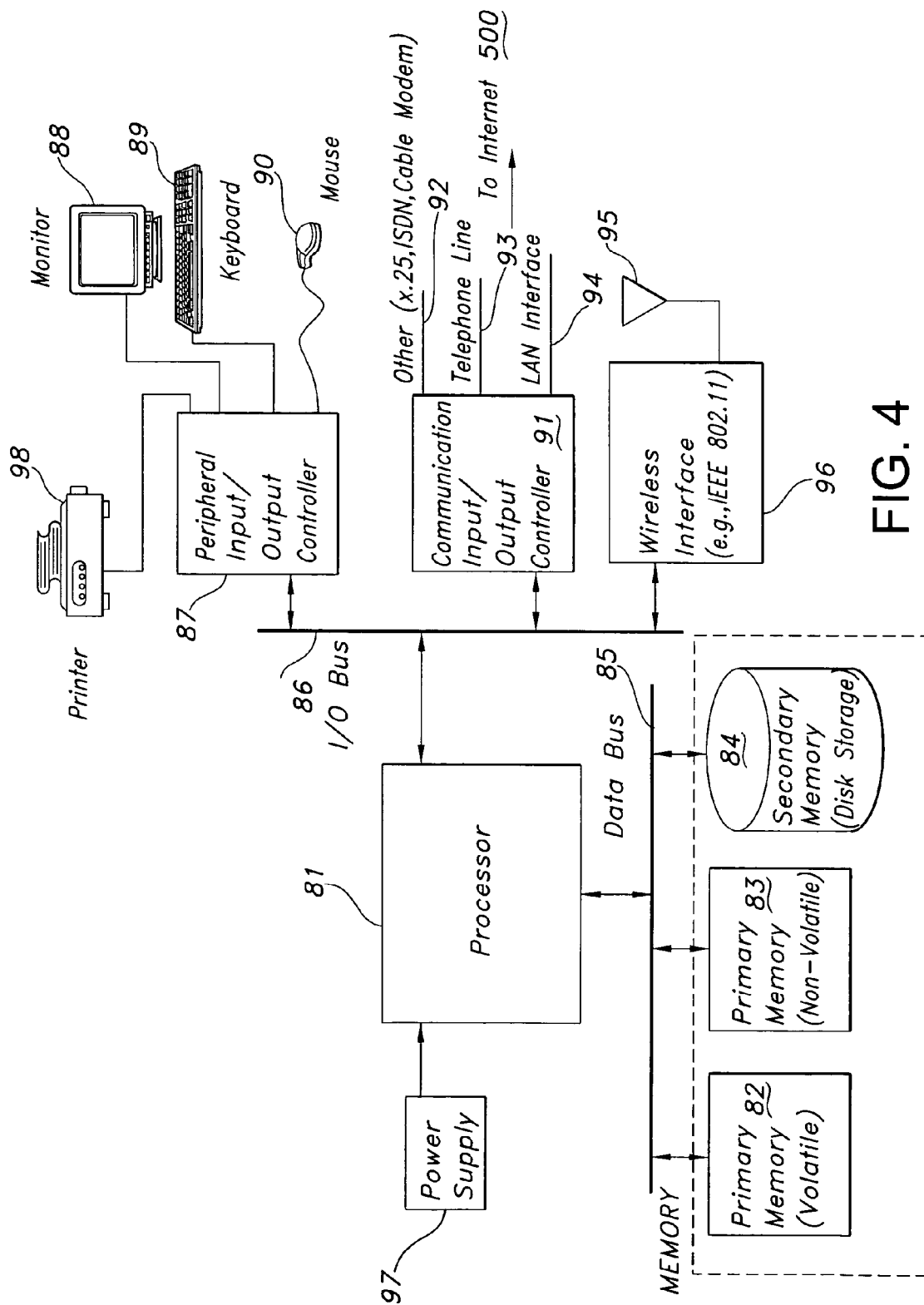
FIG. 4 is an illustration of one embodiment of a computer that can be used to practice aspects of the present invention.

In several of the embodiments of the invention referenced herein, a computer is referenced. The computer, for example, may be a mainframe, desktop, notebook or laptop, hand-held, or a handheld device such as a data acquisition and storage device. In some instances the computer may be a "dumb" terminal used to access data or processors over a network. Turning to FIG. 4, one embodiment of a computer is illustrated that can be used to practice aspects of the present invention. In FIG. 4, a processor 81, such as a microprocessor, is used to execute software instructions for carrying out the defined steps. The processor 81 receives power from a power supply 97 that may also provide power to the other components as necessary. The processor 81 communicates using a data bus 85 that is typically sixteen or thirty-two bits wide (e.g., in parallel). The data bus 85 is used to convey data and program instructions, typically, between the processor 81 and the memory. In the present embodiment, the memory may be considered to include primary memory 82 that is RAM or other forms which retain the contents only during operation, or it may be non-volatile 83, such as ROM, EPROM, EEPROM, FLASH, or other types of memory that retain the memory contents at all times. The memory could also be secondary memory 84, such as disk storage, that stores large amount of data. In some embodiments, the disk storage may communicate with the processor using an I/O bus 86 instead or a dedicated bus (not shown). The secondary memory may be a floppy disk, hard disk, compact disk, DVD, or any other type of mass storage type known to those skilled in the computer arts.

The processor 81 also communicates with various peripherals or external devices using an I/O bus 86. In the present embodiment, a peripheral I/O controller 87 is used to provide standard interfaces, such as RS-232, RS422, DIN, USB, or other interfaces as appropriate to interface various input/output devices. Typical input/output devices include local printers 98, a monitor 88, a keyboard 89, and a mouse 90 or other typical pointing devices (e.g., rollerball, trackpad, joystick, etc.).

The processor 81 typically also communicates using a communications I/O controller 91 with external communication networks, and may use a variety of interfaces such as data communication oriented protocols 92 such as X.25, ISDN, DSL, cable modems, etc. The communications controller 91 may also incorporate a modem (not shown) for interfacing and communicating with a standard telephone line 93. Finally, the communications I/O controller may incorporate an Ethernet interface 94 for communicating over a LAN. Any of these interfaces may be used to access the Internet, intranets, LANs, or other data communication facilities.

Finally, the processor 81 may communicate with a wireless interface 96 that is operatively connected to an antenna 95 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 5:
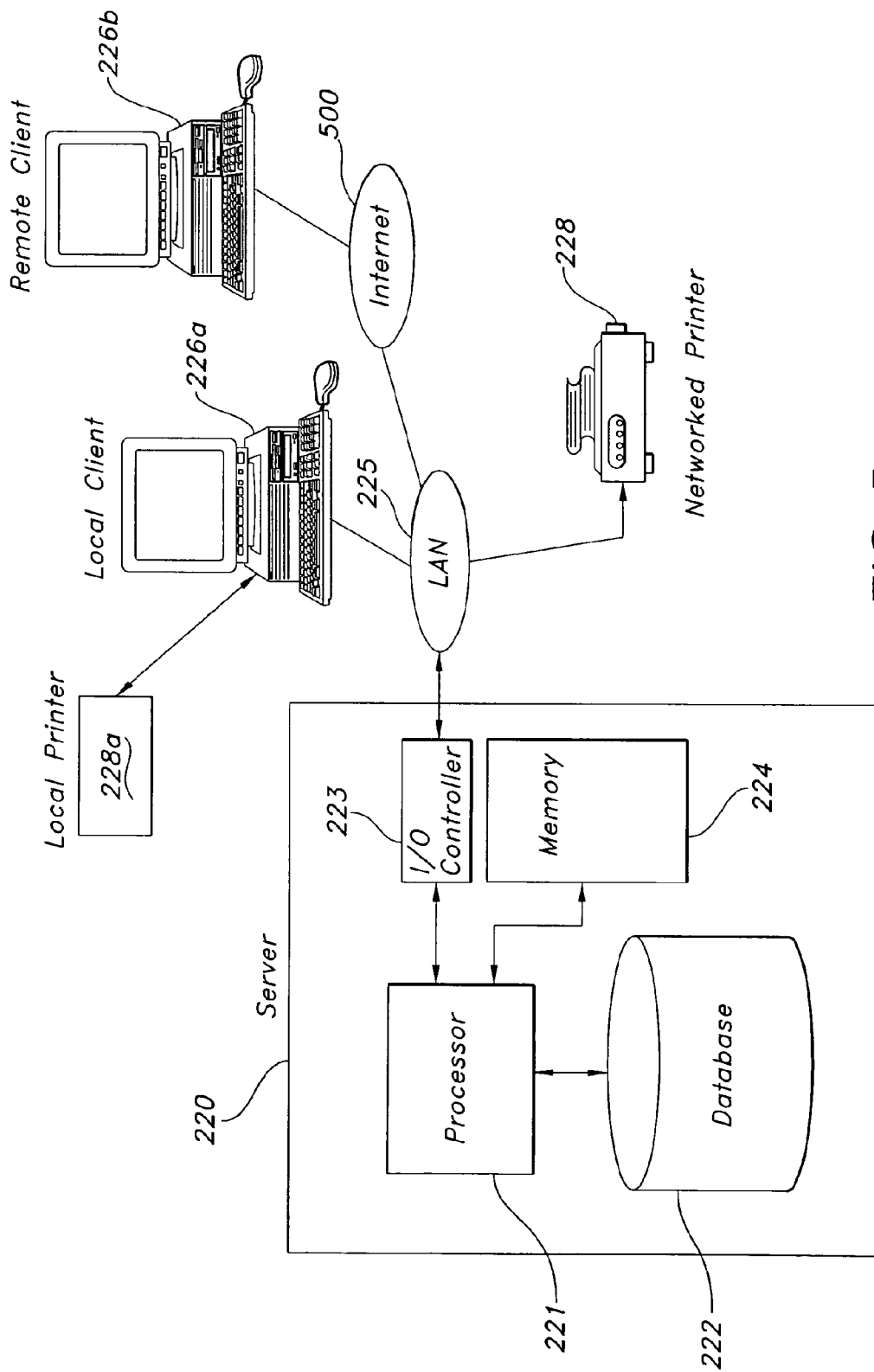
FIG. 5 is an illustration of one embodiment of a processing system having a distributed communication and processing architecture that may be used to practice aspects of the present invention.

An alternative embodiment of a processing system that may be used is shown in FIG. 5. In this embodiment, a distributed communication and processing architecture is shown involving a server 220 communicating with either a local client computer 226a or a remote client computer 226b. The server 220 typically comprises a processor 221 that communicates with a database 222, which can be viewed as a form of secondary memory, as well as primary memory 224. The processor also communicates with external devices using an I/O controller 223 that typically interfaces with a LAN 225. The LAN may provide local connectivity to a networked printer 228 and the local client computer 226a, and one or more local printers 228a. These may be located in the same facility as the server, though not necessarily in the same room. Communication with remote devices typically is accomplished by routing data from the LAN 225 over a communications facility to the Internet 500. A remote client computer 226b may execute a web browser, so that the remote client 226b may interact with the server as required by transmitted data through the Internet 500, over the LAN 225, and to the server 220.

Those skilled in the art of data networking will realize that many other alternatives and architectures are possible and can be used to practice the principles of the present invention. The embodiments illustrated in FIG. 4 and FIG. 5 can be modified in different ways and be within the scope of the present invention as claimed.

In one embodiment, as illustrated in FIG. 5, the system 10 may include a server 220, one or more computer networks, and one or more local or remote clients 226a, 226b distributed in a multi-tiered server-client relationship. The one or more computer networks may include a variety of types of computer networks such as the internet 500, a private intranet, a private extranet, a public switch telephone network (PSTN), a wide area network (WAN), a local area network (LAN) 225, or any other type of network known in the art. The network, such as the LAN 225, facilitates communications between the server 220 and the one or more local clients 226a. The LAN 225 and the internet 500 facilitate communications between the server 220 and the one or more remote clients 226b. Communication between two or more computer components may including, for example, a network transfer, a file transfer, an applet transfer, an e-mail, a Hyper-Text Transfer Protocol (HTTP) message, an XML message, a datagram, an object transfer, a binary large object (BLOB) transfer, and so on.

The system 10 of the present invention, in one embodiment, uses the internet 500 and its highly-efficient transmission protocols to send short, quick, efficient messages and data between and among the various computing components of the system 10. In this aspect, the system 10 is optimized for efficient communications and data transfer.

Distributed Processing and Printing

In one embodiment, the system 10 of the present invention may be configured to distribute the tasks 124 and commands 128 (FIG. 3) in order to optimize the use of computing capacity across the system 10. In order to optimize communications, the system 10 is configured to keep the queries and data exchanges as short and small as possible.

For example, in one embodiment, when the desired output 120 is a simple print job, the server 220 (FIG. 5) may generate the print job and send a document, in its final rendering, to a distant output device 60 or printer located at a remote facility 20. On the other hand, if the print job is large and complex, such as an international bill of lading with accompanying customs forms, the server 220 may send the data to a remote client 226b, where the document can be rendered and printed locally. In this aspect, the system 10 of the present invention may include a module or step for sizing each job in comparison to a threshold size; identifying and marking each set of commands according to its relative size. By using the server 220 to render only the print jobs that are relatively small, the system 10 handles larger requests and documents more efficiently.

Interoperability with Other Software Systems

In one embodiment, the system 10 of the present invention may be configured to access and receive data from a variety of database managements systems. In one particular embodiment, the system 10 includes a standard database connectivity interface that facilitates the acceptance of data from diverse databases. The single, standard database interface may accept and process data from any database or other data source the complies with the connectivity standard.

The connectivity standards currently available include ODBC (Open Database Connectivity), and JDBC (Java Database Connectivity). The system 10 of the present invention may include a database interface configured to comply with one or more of these connectivity standards, or with other standards that may be developed.

Referring again to FIG. 3, the step 610 of acquiring input 110, in one embodiment, may include acquiring or receiving an input 110 or request from a foreign system; i.e., a software system not specifically included in the system 10. If the request or input 110 is standard-compliant, and the embodiment of the system 10 includes a standard connectivity interface, then the system 10 will be able to accept and process the input 110, resulting in the desired output 120. The input 110, for example, may be a simple HTTP message including a standard-compliant request to access certain data based upon a key value. The system 10 recognizes the incoming message and processes it like any other input 110, through the steps shown in FIG. 3.

In this embodiment, the system 10 may be capable of receiving input data from any of a variety of standard-compliant sources. This aspect of the invention makes the system 10 particularly easy to integrate with new and different software systems. For new systems, the system 10 may include a number of additional components or drivers to perfect the interface with a new system.

CONCLUSION

The described embodiments of the invention are intended to be merely exemplary. Numerous variations and modifications will be apparent to those skilled in the art. All such variations and modifications are intended to fall within the scope of the present invention as defined in the appended claims.

The systems, methods, and objects described herein may be stored, for example, on a computer readable media. Media may include, but are not limited to, an ASIC, a CD, a DVD, a RAM, a ROM, a PROM, a disk, a carrier wave, a memory stick, and the like. Thus, an example computer readable medium can store computer executable instructions for a method for managing transportation assets. The method includes computing a route for a transportation asset based on analysis data retrieved from an experience based travel database. The method also includes receiving real-time data from the transportation asset and updating the route for the transportation asset based on integrating the real-time data with the analysis data.

What has been described above includes several examples. It is, of course, not possible to describe every conceivable combination of components or methodologies for purposes of describing the systems, methods, computer readable media and so on employed in a task management system. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

To the extent the term "includes" is employed in the detailed description or the claims, it is intended to be inclusive in a manner similar to the term "comprising" as that term is interpreted when employed as a transitional word in a claim. Further still, to the extent that the term "or" is employed in the claims (for example, A or B) it is intended to mean "A or B or both." When the author intends to indicate "only A or B but not both," the author will employ the phrase "A or B but not both." Thus, use of the term "or" herein is the inclusive use, not the exclusive use. See Bryan A. Garner, A Dictionary Of Modern Legal Usage 624 (2d ed. 1995).

The invention claimed is:

1. A method of rendering documents in a distributed system comprising a local client computer and a server computer, the method comprising:
   identifying a list of tasks to be performed in association with an input, wherein said list of tasks comprises one or more tasks for printing one or more documents;
   building one or more commands comprising instructions designed to, when executed on one of the local client computer or the server computer, accomplish said list of tasks;
   sizing said one or more commands in comparison to a threshold size, wherein those smaller than said threshold size are marked as small jobs and the others are marked as large jobs;
   in response to said one or more commands being marked a small job, rendering said one or more documents suitable for printing via said server computer executing said one or more commands associated with said small job, and sending said document to a printer associated with said local client computer; and
   in response to said one or more commands being marked a large job, sending said one or more commands associated with said large job to said local client computer for rendering and printing locally.

2. The method of rendering documents of claim 1 further comprising stacking said one or more commands in a queue until a scheduled execution time.

3. The method of rendering documents of claim 1, further comprising the step of:
   acquiring an input; and
   providing a user interface configured to receive said input from one or more input devices operated by a user at a facility.

4. The method of rendering documents of claim 1, further comprising the step of:
   acquiring an input; and
   providing a user interface configured exclusively to receive said input from one or more input devices operated by a user at a facility.

5. The method of rendering documents of claim 1, further comprising:
   providing a database application interface in communication with a database module housing a set of business rules wherein the list of tasks to be performed is based at least in part on the set of business rules;
   providing an inventory application interface in communication with an inventory module; and
   providing a printing application interface in communication with a printing module, said printing module configured to control said printer.

6. The method of rendering documents of claim 1, further comprising:
   providing a database application interface written according to a database connectivity standard, such that data from any data source compliant with said connectivity standard may be accepted and processed.

7. An apparatus comprising at least one processor and at least one memory including computer program code, the at least one memory and the computer program code configured to, with the processor, cause the apparatus to at least:
   identify a list of tasks to be performed in association with an input, wherein said list of tasks comprises one or more tasks for printing one or more documents;
   build one or more commands comprising instructions designed to, when executed on one of the local client computer or the server computer, accomplish said list of tasks;
   size said one or more commands in comparison to a threshold size, wherein those smaller than said threshold size are marked as small jobs and the others are marked as large jobs;
   in response to said one or more commands being marked a small job, render said one or more documents suitable for printing via said server computer executing said one or more commands associated with said small job, and sending said document to a printer associated with said local client computer; and
   in response to said one or more commands being marked a large job, send said one or more commands associated with said large job to said local client computer for rendering and printing locally.

8. The apparatus of claim 7 further configured to:
   stack said one or more commands in a queue until a scheduled execution time.

9. The apparatus of claim 7 further configured to:
   communicate with a user interface configured to receive said input from one or more input devices operated by a user at a facility.

10. The apparatus of claim 7 further configured to:
    communicate with a user interface configured exclusively to receive said input from one or more input devices operated by a user at a facility.

11. The apparatus of claim 7 further configured to:
    transmit and receive data via the Internet, between said local client computer and said distant server computer.

12. The apparatus of claim 7 further configured to:
    transmit and receive data via the Internet, between a local client computer and a server computer;
    differentiate said one or more commands as either simple commands or complex commands based at least in part on said result of said comparison of said size of said one or more commands with said threshold size, wherein said complex commands require greater processing time and capacity; and
    distribute the execution of said one or more commands between and among said local client computer and said server computer in order to optimize the use of computing capacity, such that said simple commands are executed using said distant server computer and said complex commands are sent to said local client computer for execution.

13. The apparatus of claim 7 further comprising:
a database application interface in communication with the database housing a set of business rules;
an inventory application interface in communication with an inventory module; and
a printing application interface in communication with a printing module, said printing module configured to control said output device.

14. The apparatus of claim 7 further comprising:
a printing application interface in communication with a printing module, said printing module configured to control said output device, wherein said output device comprises one or more printers.

* * * * *